United States Patent
Miyashita et al.

(10) Patent No.: US 6,289,173 B1
(45) Date of Patent: Sep. 11, 2001

(54) ECL IN A RECORDING AND REPRODUCTION DEVICE IN WHICH COEFFICIENT GROUPS INCLUDING COEFFICIENT DATA CORRESPONDING TO LOW FREQUENCY COMPONENTS OF THE FIRST AXIS IN AT LEAST TWO OVERLAPPED CODING BLOCKS ARE NOT RECORDED BY THE SAME RECORDING HEAD

(75) Inventors: Mitsuhiro Miyashita, Nishinomiya; Tatsushi Bannai, Sakai, both of (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/101,832

(22) PCT Filed: Jan. 17, 1997

(86) PCT No.: PCT/JP97/00092

§ 371 Date: Jul. 17, 1998

§ 102(e) Date: Jul. 17, 1998

(87) PCT Pub. No.: WO97/26760

PCT Pub. Date: Jul. 24, 1997

(30) Foreign Application Priority Data

Jan. 19, 1996 (JP) .................................................. 8-026076

(51) Int. Cl.[7] ........................................................ H04N 7/26
(52) U.S. Cl. ........................... 386/111; 386/124; 714/746
(58) Field of Search ................................. 386/116, 21, 40, 386/33, 111, 112, 124; 375/240.18, 240.2, 240.27; 714/710, 746, 747

(56) References Cited

U.S. PATENT DOCUMENTS 5,933,571  *  8/1999  Bannai et al. ..................... 386/109

FOREIGN PATENT DOCUMENTS

| 0 612 190 | 8/1994 | (EP) . |
| 0 680 209 | 11/1995 | (EP) . |
| 0680209A2 * | 2/1995 | (GB) .............................. H04N/5/91 |
| 7-23423 | 1/1995 | (JP) . |
| 7-98944 | 4/1995 | (JP) . |

* cited by examiner

Primary Examiner—Wendy R. Garber
Assistant Examiner—Po-lin Chieu
(74) Attorney, Agent, or Firm—Wenderoth, Lind & Ponack, L.L.P.

(57) ABSTRACT

In a recording and reproducing apparatus with image coding for compression coding of digital video signals and for recording and reproducing the compressed code, digital video signals are divided on a screen into coding blocks which are overlapped so as to share boundary pixels. DCT coefficient data in each coding block are divided into a plurality of groups, and coefficient data in two coding blocks overlapping on the screen are recorded to separate regions on a recording medium. When an error has occurred during a reproducing process, the state of the error occurrence is analyzed and an error correction responsive to the state of error occurrence is performed on coefficient data that has been lost due to the error. Thus, a stable, successful reproduced image can be obtained even if an error occurs during the recording and reproducing process.

8 Claims, 5 Drawing Sheets

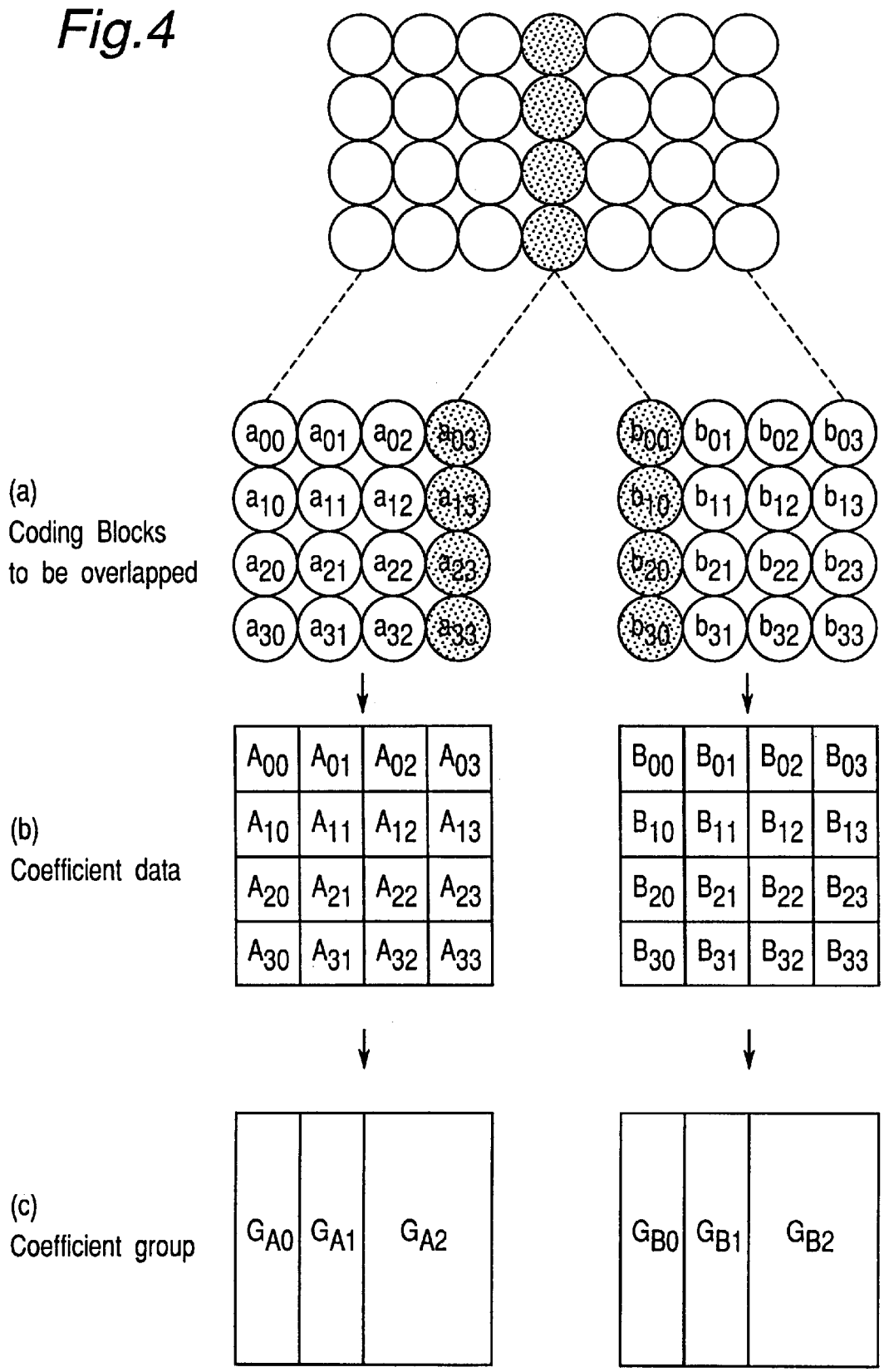

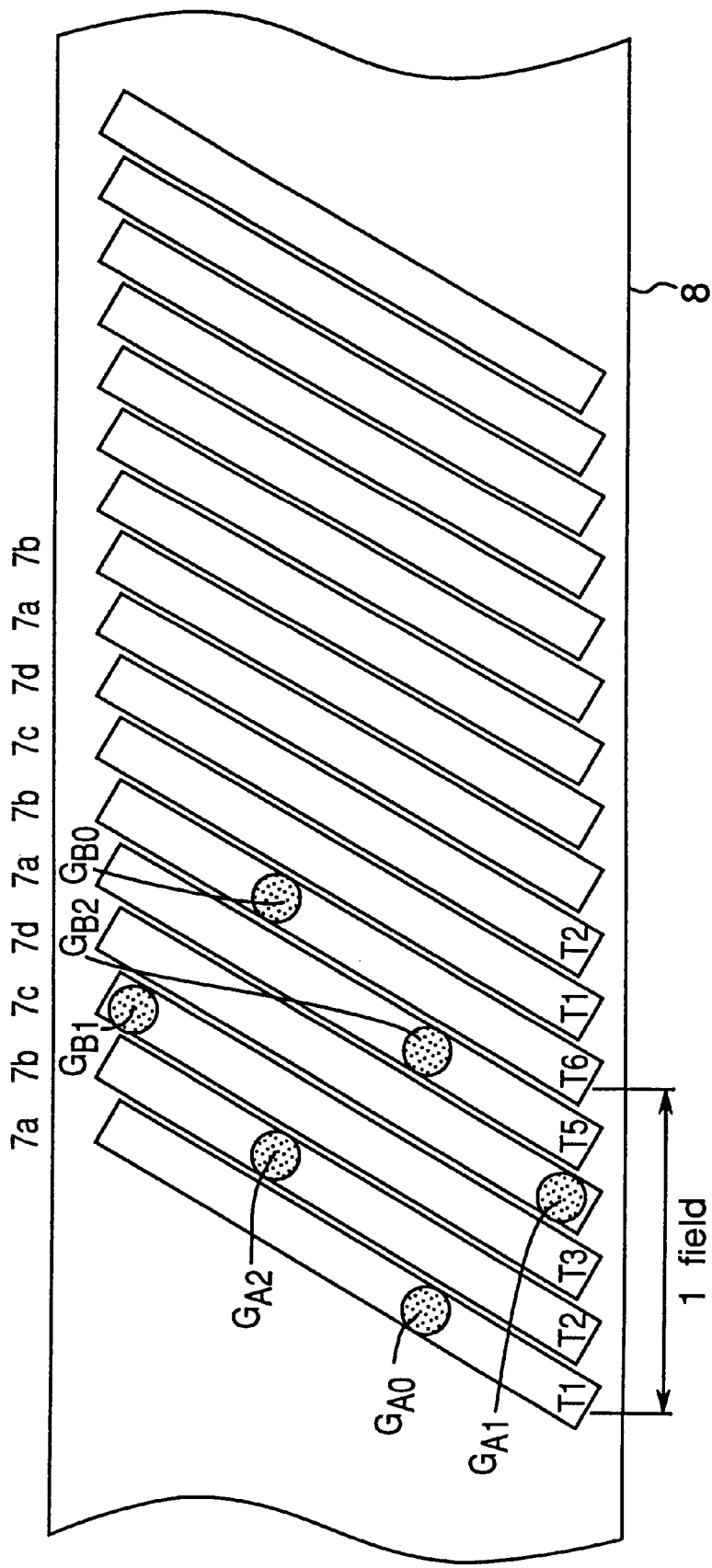

ECL IN A RECORDING AND REPRODUCTION DEVICE IN WHICH COEFFICIENT GROUPS INCLUDING COEFFICIENT DATA CORRESPONDING TO LOW FREQUENCY COMPONENTS OF THE FIRST AXIS IN AT LEAST TWO OVERLAPPED CODING BLOCKS ARE NOT RECORDED BY THE SAME RECORDING HEAD

TECHNICAL FIELD

The present invention relates to a recording and reproducing apparatus for recording digital video signals subjected to compression coding for image coding.

BACKGROUND ART

In recent years, a variety of digital instruments have been developed as digital signal processing techniques are improved. Small-sized digital video recorders for recording digital video signals in the form of compressed codes have been realized lately. Among various methods that have been proposed for the compression coding of digital video signals, two-dimensional discrete cosine transform (DCT) coding, which is one of the methods for frequency conversion of digital video signals in the unit of a block, has become the mainstream as used in JPEG and MPEG. In this method, digital video signals are divided into a plurality of coding blocks and discrete cosine transform is performed for each coding block, and further the resulting coefficient data are subjected to variable-length coding for each block, to compress data.

However, in such a recording and reproducing apparatus using compression coding, if an error has occurred to data during the recording or reproducing process, variable-length codes in a certain range subsequent to the error occurrence point could not be decoded. Also, even if the variable-length decoding is refreshed by detecting a break in the variable-length code by means of refresh codes or the like, the variable-length codes themselves over a range from the occurrence of an error to the refreshing could not be decoded. In such a case, the image would drop out in the unit of the block on the reproduction screen, and the dropping out would succeed over several blocks.

In order to solve this problem in the compression coding, in the recording and reproducing apparatus with image coding described in Japanese Patent Laid-Open Publication 7-298194/1995 by the present inventors, errors are corrected by using coefficient data of neighboring coding blocks having high spatial correlation. In this error correction, for recording, coefficient data within one coding block are mixed with coefficient data of a boundary portion within a neighboring coding block and subjected to shuffling. In the shuffling, it has also been proposed to divide neighboring coding blocks so that their boundary portion is shared therebetween. Then, the discrete cosine transform is performed with respect to coding blocks constituting the same region on the screen, the resulting coefficient data are classified into groups, and the groups are recorded in separate regions on the recording medium. In this apparatus, even if an error occurs during recording or reproducing process, there will never occur any collective disappearance of associated coefficient data. Further, even if coefficient data has disappeared upon occurrence of an error, correct data can be restored more accurately by using the correlation of coefficient data. Therefore, the stability of recording and reproducing operations can be greatly enhanced without causing the image to disappear in blocks.

However, even in this recording and reproducing apparatus with image coding, if a plurality of errors of coefficient data have occurred within the same coding block, correct restoration by error correction cannot be done. It is desirable that an error can be corrected so that image is not dropped out in such a situation as mentioned above.

SUMMARY OF THE INVENTION

An object of the present invnetion is to provide a recording a reproducing apparatus with image coding in which an image will never be dropped out in blocks even if a plurality of errors occur when digital video signals are recorded or reproduced with compression coding.

In a recording and reproducing apparatus with image coding according to the present invention, for recording process, overlap blocking means divides input digital video signals into data in two-dimensional coding blocks each having first and second axes and comprises a plurality of pixel data, in such a way that neighboring coding blocks are overlapped with each other so as to share at least one boundary pixel in a first-axis (for example, horizontal) direction. Orthogonal transform means performs two-dimensional frequency conversion (for example, discrete cosine transform) for pixel data of coding blocks obtained by the overlap blocking means to generate coefficient data of individual frequencies. Shuffling means divides the coefficient data obtained by the orthogonal transform means into a plurality of coefficient groups so that the coefficient groups do not have the same frequency component of the second (for example, vertical) axis at least in a frequency region in the coding blocks corresponding to low frequency components of the first (for example, horizontal) axis. Recording means locates recording data so that the plurality of coefficient groups in the same coding block obtained by the shuffling means are recorded so as to be dispersed into separate regions on a recording medium, and it adds error correction codes for the coefficient data.

For a reproducing process, reproduction decoding means reproduces recording data from the recording medium and decodes the coefficient data of the individual coefficient groups, while it detects the presence or absence of an error of coefficient data. Deshuffling means integrates coefficient data outputted from the reproduction decoding means into coding blocks for recording. When an error has been detected by the reproduction decoding means, error-correction control means outputs an error-correction control signal based on the number of errors within a coding block and the number of the order of the two-dimensional frequencies of coefficient data to which errors have occurred, and error correcting means corrects the errors of the coefficient data by an error correcting method selected by an error-correction control signal of the error correction control means with respect to the coding block in which errors have been detected. block in which errors have been detected.

Inverse orthogonal transform means decodes pixel data by frequency inverse conversion of the coefficient data that have been error corrected by the error correcting means, and relocating means generates a digital video signal by relocating pixel data to the coding blocks for recording. When an error has occurred, such a possibility can be prevented that all the coefficient data within a block may be dropped out so as to lack in blocks during reproducing process. Further, the stability of reproduced images can be enhanced by performing error correction with coefficient data of neighboring blocks having high spatial correlation.

Preferably, the recording means locates recording data, so that coefficient groups belonging to the same coding block are not recorded to the same recording track on the recording medium. Upon occurrence of an error, such a possibility can be prevented that all the coefficient data within the block may be dropped out so as to lack in the unit of block during reproducing process.

Preferably, the recording and reproducing apparatus with image coding further comprises a rotary cylinder for helically scanning the recording medium, and signal recording means having a plurality of recording heads attached to the rotary cylinder. The recording means outputs recording data to the signal recording means so that coefficient groups including coefficient data corresponding to low frequency components of the first (for example, horizontal) axis within at least two overlapped coding blocks in the overlap relationship are not recorded to the same recording head. In a different way, the recording means outputs recording data so that coefficient groups including coefficient data corresponding to the same horizontal frequency component in two overlapped coding blocks in the overlap relationship are not recorded to the same recording head. When an error has occurred, such a possibility can be prevented that all the coefficient data within the block may dropped out so as to lack in blocks during reproducing process.

Preferably, the error-correction control means (a) outputs an zero error correction signal for replacing an error coefficient with a zero when a plurality of error coefficients are present in coefficient data having the same frequency in the second (for example, vertical) axis in two coding blocks in the overlap relationship and when all the errors are present at numbers of order higher than a specified number of order, (b) outputs an overlap correlation error correction signal for instructing error correction by making use of correlation between coefficient data of neighboring coding blocks when a plurality of errors are present in coefficient data having the same frequency in the second (for example, vertical) axis in two coding blocks in the overlap relationship and when only one error coefficient is present at numbers of order lower than a specified number of order, and (c) outputs a three-dimensional error correction signal for replacing all the coefficient data in the coding block with coefficient data of the preceding frame or preceding field when two or more errors are present at numbers of order lower than a specified number of order on a coding block basis and when error coefficients are present on a side of lower numbers of order than a specified number of order in coefficient data having the same frequency in the,second (for example, vertical) axis on the coding block basis, and outputs a zero error correction signal for replacing the error coefficients with zeroes for coding blocks when no error coefficients are present in the coding blocks on a side of lower numbers of order than the specified number of order on the coding block basis. In this way, an appropriate error correction signal is outputted in response to an error occurrence state. Thus, an error correction responsive to the error occurrence state can be achieved.

Then, (d) when an overlap relationship error correction signal is received from the error-correction control means, the error correcting means corrects, by using correlation of pixels overlapped in the first axis on the screen, error coefficients corresponding to frequency components of the lowest region of the first (for example, horizontal) axis out of a plurality of error coefficients in coefficient data having the same frequency in the second (for example, vertical) axis in two coding blocks in the overlap relationship, and moreover corrects the remaining error coefficients as zeroes. Further, (e) when a zero error correction signal is received from the error-correction control means, the error correcting means corrects to zeroes all the plurality of error coefficients among coefficient data having the same frequency in the second (for example, vertical) axis in two coding blocks in the overlap relationship. Furthermore, (f) when a three-dimensional error correction signal is received, the error correcting means replaces all the coefficient data within a coding block with coefficient data of a corresponding coding block preceding by one field or one frame and constituting the same region on the screen. In this way, because the error correcting means receives an appropriate error correction signal responsive to an error occurrence state, error correction is performed by using coefficient date of neighboring blocks having a high spatial correlation, and data are corrected appropriately, by making use of the properties of the image. Thus, the stability of reproduced images can be improved. More preferably, the error-correction control means changes the specified number of the order of frequencies in the first (for example, horizontal) axis in response to the number of order of frequencies in the second (for example, vertical) axis.

BRIEF DESCRIPTION OF THE DRAWINGS

FIG. 4 is a diagram for explaining the relationship between coefficient data and coefficient groups of coding blocks in the embodiment; and FIG. 5 is a diagram for explaining recording positions of coefficient groups to be recorded on the recording medium as well as the recording heads.

DESCRIPTION OF THE PREFERRED EMBODIMENTS

Figure 1:
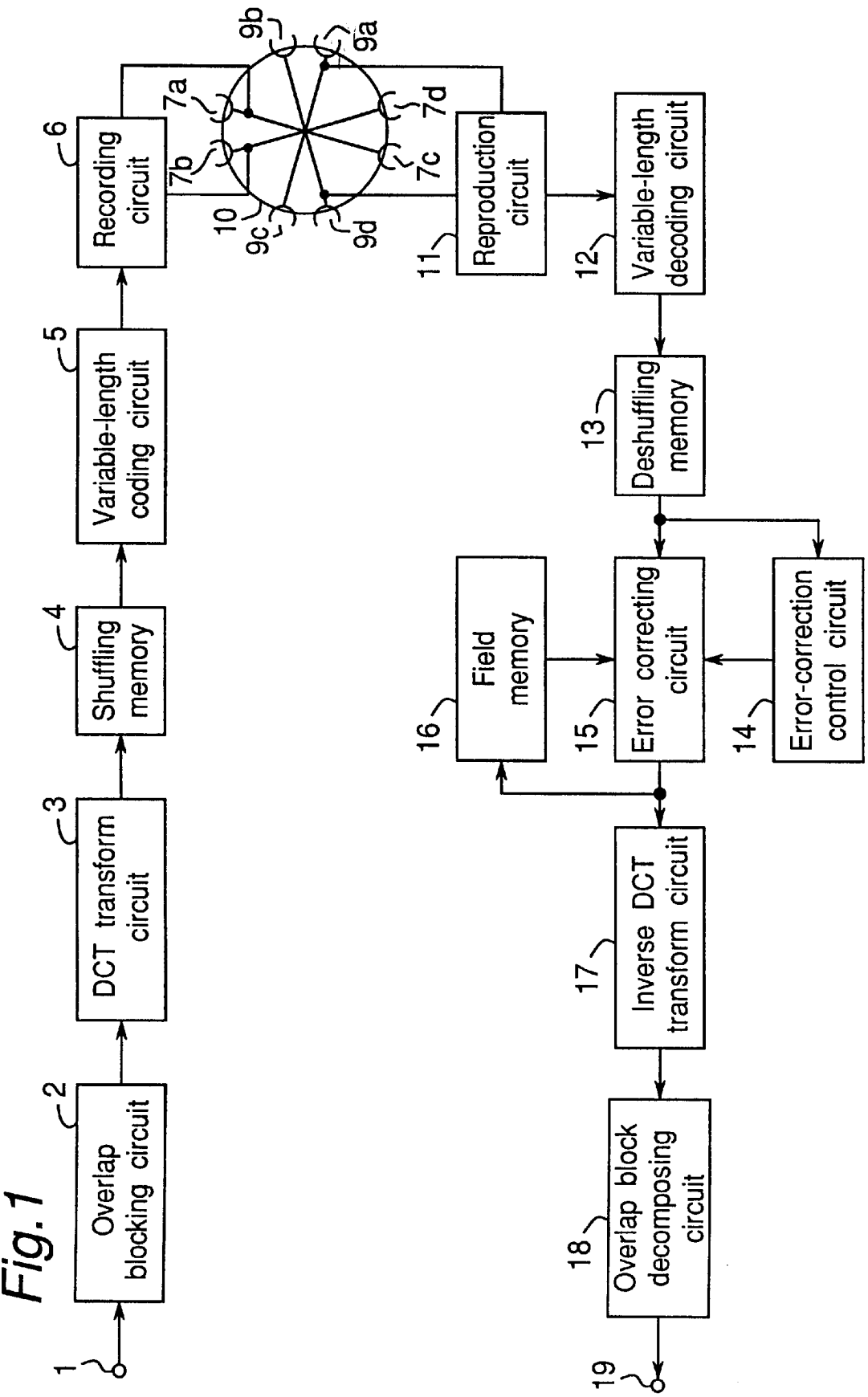
FIG. 1 is a block diagram of an overall setup of a recording and reproducing apparatus with image coding according to the present invention.

Hereinbelow, a recording and reproducing apparatus with image coding according to an embodiment of the present invention is explained with reference to the appended drawings. FIG. 1 is a block diagram showing the overall setup of a recording and reproducing apparatus with image coding. Digital video signals are transmitted to the apparatus successively in steps of one frame or field. A digital video signal is inputted to an overlap blocking circuit 2 via an input terminal. The overlap blocking circuit 2 is a circuit which divides digital video signals into coding blocks of a N×M (e.g., N=M=4) two-dimensional matrix so that two coding blocks neighboring on the screen share boundary pixels between them. Generally, when input digital video signals are divided into two-dimensional coding blocks each comprising a plurality of pixel data, neighboring coding blocks share at least one boundary pixel therebetween horizontally or vertically and overlap each other. In this embodiment, as will be described later with reference to FIG. 4, digital video signals are divided horizontally so that four boundary pixels are shared therebetween in the horizontal direction. A discrete cosine transform (DCT) circuit 3 is orthogonal transform means for performing discrete cosine transform on pixel data of N×M coding blocks outputted from the overlap blocking circuit 2 to generate coefficient data in a two-dimensional frequency region.

The coefficient data obtained by the DCT circuit 3 are divided into a form suitable for error correction, and recorded to a recording medium 8. A shuffling memory 4 inputs coefficient data of the discrete cosine transform circuit 3 and temporarily stores them in the form of a plurality of divided coefficient groups having no identical vertical frequency components at least in a frequency region of horizontal low frequency components in the coding block. A variable-length coding circuit 5 encodes coefficient data in the individual coefficient groups outputted from the shuffling memory 4 invariable lengths. A recording circuit 6 inputs codes of the variable-length coding circuit 5 and changes the arrangement of data so that at least coefficient groups in the same coding block can be dispersed and recorded into separate tracks and regions on the recording medium 8 shown in FIG. 5. Further, it adds error correction codes and converts the data into recording codes, thus outputting them to recording heads 7a–d. That is, a plurality of coefficient groups in the same coding block are recorded so as to be dispersed into different tracks and regions, respectively.

The recording medium 8 is a magnetic tape for recording and reproducing digital data. For recording and reproduction, a rotary cylinder 10, recording heads and reproducing heads attached to the rotary cylinder 10 are used. The rotary cylinder 10 is intended to helically scan the magnetic tape, and the recording heads 7a, 7b, 7c, 7d and the reproducing heads 9a, 9b, 9c, 9d are mounted to the rotary cylinder 10. The recording heads 7a, 7b scan adjacent tracks, respectively. The recording heads 7c, 7d mounted at positions 180° opposite to the recording heads 7a, 7b scan adjacent tracks in succession. The reproducing heads 9a, 9b and reproducing heads 9c, 9d are provided to scan the same tracks relatively as the recording heads 7a–d.

A reproduction circuit 11 demodulates signals read from the reproducing heads 9a, 9b, 9c, 9d to transform recording codes to original codes and, upon detection of a code error, adds an error-correction error flag. A variable-length decoding circuit 12 converts a variable-length code demodulated by the reproduction circuit 11 into coefficient data and, upon occurrence of an error in the coefficient data, adds a decoding error flag. In this case, the reproduction circuit 11 and the variable-length decoding circuit 12 have accomplished the functions of reproducing recorded data in the recording medium 8 and decoding the coefficient data of coefficient groups as well as a further function as reproduction-process decoding means for detecting the presence or absence of any error in coefficient data. A deshuffliing memory 13 integrates the coefficient data decoded by the variable-length decoding circuit 12 into coding blocks during the recording process, and temporarily stores the data.

An error-correction control circuit 14 outputs an error-correction control signal to an error correcting circuit 15 in response to an error occurrence state in the coding block in which an error has been detected. As will be described later, when an error has been detected by reproduction-process decoding means, the error-correction control circuit 14 outputs an error-correction control signal based on the number of errors that have occurred in the coding block and on the number of the order of two-dimensional frequency components of the coefficient data to which an error has occurred. The error correcting circuit 15, as will be detailed later, corrects an error of coefficient data by an error correcting method selected by an error-correction control signal from the error-correction control circuit 14 on the coding block in which the error has been detected. A field memory 16 stores, in the unit of a field, coefficient data obtained in the unit of a block and corrected by the error correcting circuit 15, and feeds back the coefficient data preceding by one frame to the error correcting circuit 15 when required.

An inverse discrete cosine transform circuit 17 performs a transform process inverse to the transform performed by the discrete cosine transform circuit 3, to output pixel data including brightness data and hue data in each block. An overlap block decomposing circuit 18 returns pixel data divided in the unit of a coding block into digital video signals of the form in which the data have been inputted on recording, to output the video signals from an output terminal 19. The inverse discrete cosine transform circuit 17 and the overlap block decomposing circuit 18 function as inverse orthogonal transform means for decoding pixel data by frequency-inverse-transform of reproduced coefficient data, and another function as a means for relocating these pixel data to the coding blocks at the time of recording.

The recording and reproducing apparatus with image coding constructed as explained above is described in its operation with reference to FIGS. 2 to 5. For ease of understanding, an example is explained wherein a coding block comprises 4×4 pixels and input digital video signals are subjected to compression coding in the unit of a field, and data are recorded to six tracks by using two-channel recording heads provided 180° opposite to each other on the rotary cylinder.

Figure 2:
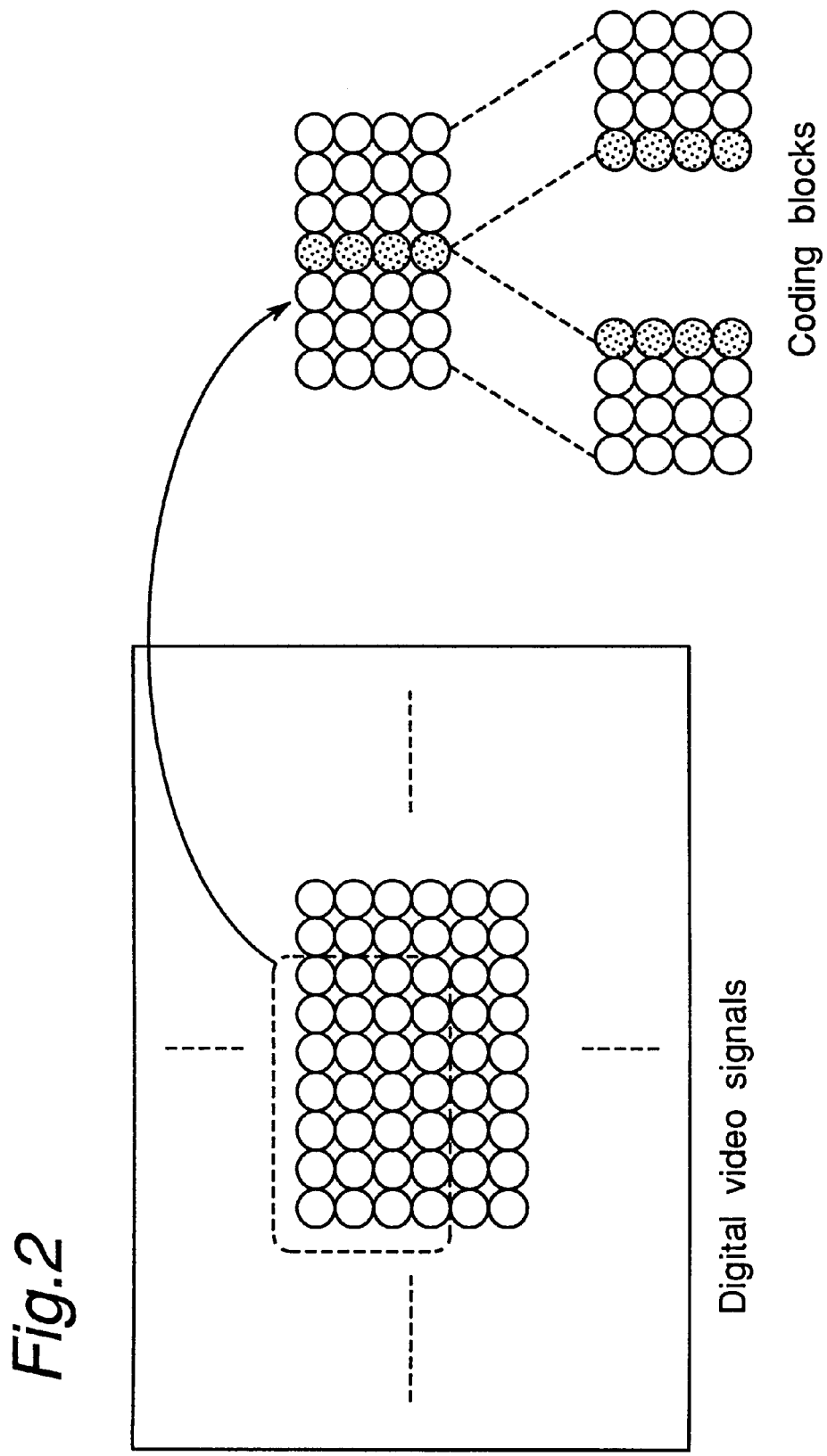
FIG. 2 is a diagram on the concept of overlap block division in an embodiment of the invention.

When digital video signals are supplied to the input terminal 1 in FIG. 1, the overlap blocking circuit 2 delimits the digital video signal, as shown in FIG. 2, so that two 4×4 coding blocks adjacent to each other on the screen share the four pixels present at their edges, thus dividing the signals into overlapped 4×4 coding blocks. In FIG. 2, hatching represents the shared pixels. Next, the discrete cosine transform circuit 3 performs frequency transform on the pixel data for each coding block to generate two-dimensional coefficient data. Then, these coefficient data are stored in the shuffling memory 4.

Figure 3:
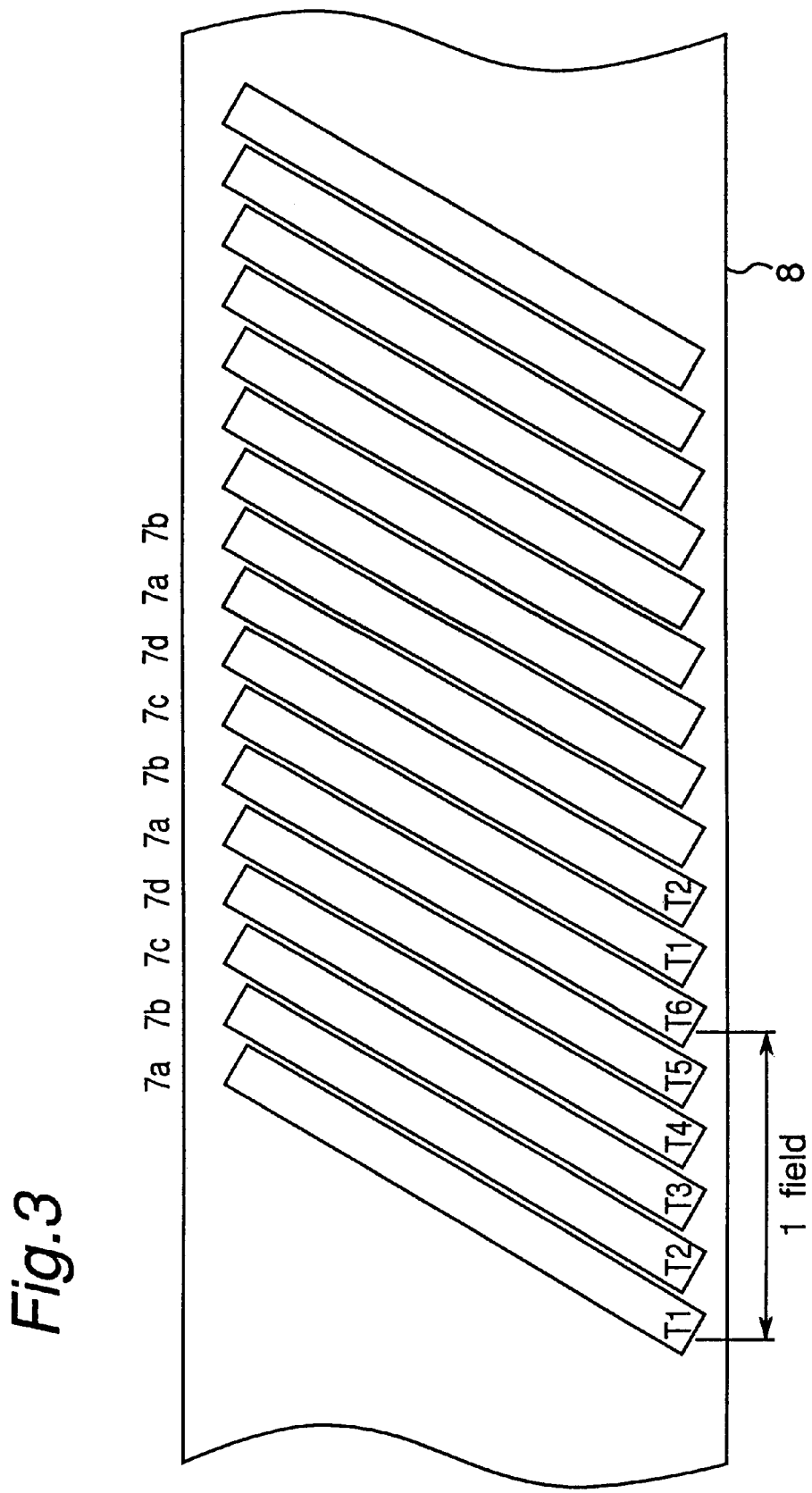
FIG. 3 is a schematic diagram on a recording area of recording heads on a recording medium in the embodiment.

The variable-length coding circuit 5 encodes coefficient data outputted from the shuffling memory 4 in variable lengths, according to predetermined shuffling rules. The recording circuit 6 adds error correction codes to coefficient data which have been coded in variable lengths, subjects them to recording modulation, and then supplies them to the two-channel recording heads 7a–d through a recording amplifier. The recording heads 7a, 7b, 7c, 7d record input coefficient data onto the recording medium 8. In this process, digital video signals of one field are recorded to six tracks. Data are recorded to the tracks T1, T2, T3, T4 on the recording medium 8 alternately by the recording heads 7a, 7b and 7c, 7d as shown in FIG. 3. The recording heads 7a–d scan the tracks T1 to T6, and record the input one field digital video signals onto the six tracks on the recording medium 8.

Next, the shuffling rules in the shuffling memory 4 are described with reference to FIG. 4. In FIG. 4, (a) illustrates two coding blocks to be overlapped, comprising of a block of $(a_{00}, a_{01}, a_{02}, a_{03})$–$(a_{30}, a_{31}, a_{32}, a_{33})$ and another block of $(b_{00}, b_{01}, b_{02}, b_{03})$–$(b_{30}, b_{31}, b_{32}, b_{33})$, respectively. In this case, a row $(a_{03}, a_{13}, a_{23}, a_{33})$ and another row $(b_{00}, b_{10}, b_{20}, b_{30})$ are overlapping pixels. By discrete cosine transform of these pixel data, coefficient data $A_{00}$–$A_{33}$, $B_{00}$–$B_{33}$ shown in (b) are obtained. In the coefficient data, for example, $A_{00}$ is coefficient data whose numbers of order of horizontal frequency and vertical frequency are both 0, representing the DC component of the image, $A_{03}$ is coefficient data whose number of order of horizontal frequency is 3 and whose number of order of vertical frequency is 0, and $A_{30}$ is coefficient data whose number of order of horizontal frequency is 0 and whose number of order of vertical frequency is 3.

The shuffling rules in this case are shown in (c). The coefficient data in a coding block is divided into three groups in total. A group $G_{A0}$ comprises four coefficient data ($A_{00}$, $A_{10}$, $A_{20}$, $A_{30}$) in which the number of order of horizontal frequency is in the lowest region 0 and which do not include the same vertical frequency, a group $G_{A1}$ comprises of coefficient data ($A_{01}$ $A_{11}$, $A_{21}$, $A_{31}$) in which the number of order of horizontal frequency is 1, and a group $G_{A2}$ comprises eight coefficient data ($A_{02}$, $A_{12}$, $A_{22}$, $A_{32}$, $A_{13}$, $A_{23}$, $A_{33}$) in which the number of order of horizontal frequency is as high as 2 and 3. A reason that the high-frequency two rows of data are put together into one group is to prevent a decrease the coding efficiency. The neighboring coding block is, also divided into groups $G_{B1}$, $GB_{B2}$, similarly. It is noted that FIG. 4 (c) only shows an example of group division and some other type of division may be used. 7b (or 7d) that are different from each other, respectively, while the coefficient groups $G_{A1}$ and $G_{B1}$, are recorded by the heads 7d (or 7b), 7c (or 7a) that are different from each other, respectively.

In this way, the shuffling memory 4 performs shuffling in such a way that six groups $G_{A0}$, $G_{A1}$, $G_{A2}$, $G_{B0}$, $G_{B1}$, $G_{B2}$ in two overlapping coding blocks are recorded at least to separate tracks and regions on the recording medium 8. In the example shown in FIG. 5, the data of the groups $G_{A0}$, $G_{A2}$, $G_{B1}$, $G_{A1}$, $G_{B2}$, $G_{B0}$ are recorded in succession to the tracks T1–T6 to record one field. That is, a plurality of groups are recorded to tracks and regions separate from each other, respectively. Further, as shown in FIG. 5, the shuffling is performed in such a way that the same recording head does not record any coefficient groups having the same horizontal frequency component in the same coding block, and that the same recording head does not record the coefficient groups $G_{A0}$, $G_{B0}$ and the coefficient groups $G_{A1}$, $G_{B1}$ corresponding to a low frequency region in horizontal frequency components. That is, a plurality of recording heads are provided, and one recording head records a coefficient group showing horizontal frequency components in the same coding block, while another different recording head records a coefficient group different from this coefficient group. In the example shown in FIG. 5, the recording heads 7a, 7b, 7c, 7d record signals to one track in turn. The coefficient groups $G_{A0}$ and $G_{B0}$ are recorded by the heads 7a (or 7c), 7b (or 7d) different from each other, respectively, while the coefficient groups $G_{A1}$ and $G_{B1}$ are recorded by the heads 7d (or 7b), 7c (or 7a) different from each other, respectively.

Next, reproduction of the coefficient data recorded by the above-mentioned recording process is described. The reproducing heads 9a, 9b, 9c, 9d reproduce the signals recorded by the recording heads 7a, 7b, 7c, 7d from the recording medium 8 and supply the reproduction outputs to the reproduction circuit 11. The reproduction circuit 11 demodulates this reproduction output and performs error correction. Then it supplies the coefficient data of variable-length coding and the error-correction error flag as a result of error-correction to the variable-length decoding circuit 12. The variable-length decoding circuit 12 performs variable-length decoding of the coefficient data of variable-length coding, and outputs a decoding error flag showing whether or not variable-length decoding has been accomplished correctly, along with the decoded coefficient data, to the deshuffling memory 13.

This decoding error flag is kept to be outputted over an interval until the variable-length decoding is refreshed by a refresh code or the like subsequent to an error occurrence point shown by the error-correction error flag outputted by the reproduction circuit 11. That is, the decoding error flag is outputted for the coefficient data to be decoded during the interval. In a different way, a decoding error flag is outputted when a certain number of decoding operations are not performed correctly during the interval in which a specified number of coefficient data should be decoded.

The error-correction control circuit 14 reads, from the deshuffling memory 13, coefficient data constituting the same region on the screen in the unit of a block and the decoding error flags corresponding to the individual coefficient data, and outputs an error-correction control signal of an error correction method to the error correcting circuit 15. The error correcting circuit 15 corrects errors according to the error correction control signal for a coding block in which an error coefficient is present, by using either the inputted coefficient data in two coding blocks having the overlap relationship, or coefficient data stored in the field memory 16 for a coding block preceding by one field and located in the same region on the screen. Then, the coefficient data subjected to error correction are outputted to the inverse discrete cosine transform circuit 17, and the contents of the memory space on the same region on the screen accumulated in the field memory 16 are updated.

The coefficient data subjected to error correction are transformed into pixel data by the inverse discrete cosine transform (inverse DCT) circuit 17, and supplied to the overlap block decomposing circuit 18. The overlap block decomposing circuit 18 restores the pixel data divided in the unit of a coding block to digital video signals in the form in which the data have been inputted via the input terminal 1 on recording, and then outputs the signals to the output terminal 19.

Now, the operations of the error-correction control circuit 14 and the error correcting circuit 15 are described in more detail. As shown in FIG. 4, two coding blocks in the overlap relationship include common pixels on the screen, allowing error correction to be achieved by using the strong pixel correlation. Referring to the overlapping pixel correlation, in the example of FIG. 4, common pixels in the overlap relationship have the following relationship:

$$\begin{pmatrix} a_{03} \\ a_{13} \\ a_{23} \\ a_{33} \end{pmatrix} = \begin{pmatrix} b_{00} \\ b_{10} \\ b_{20} \\ b_{30} \end{pmatrix} \quad (1)$$

If the transform base of DCT is represented by a matrix D and if pixel data on both sides of Equation (1) are represented by coefficient data, then the following Equations (2) and (3) are obtained:

$$\begin{pmatrix} a_{03} \\ a_{13} \\ a_{23} \\ a_{33} \end{pmatrix} = D^T \begin{pmatrix} A_{00} & A_{01} & A_{02} & A_{03} \\ A_{10} & A_{11} & A_{12} & A_{13} \\ A_{20} & A_{21} & A_{22} & A_{23} \\ A_{30} & A_{31} & A_{32} & A_{33} \end{pmatrix} d_3, \quad (2)$$

and $$\begin{pmatrix} b_{00} \\ b_{10} \\ b_{20} \\ b_{30} \end{pmatrix} = D^T \begin{pmatrix} B_{00} & B_{01} & B_{02} & B_{03} \\ B_{10} & B_{11} & B_{12} & B_{13} \\ B_{20} & B_{21} & B_{22} & B_{23} \\ B_{30} & B_{31} & B_{32} & B_{33} \end{pmatrix} d_0. \quad (3)$$

Substituting Equations (2) and (3) into Equation (1) yields the following Equation (4):

$$\begin{pmatrix} A_{00} & A_{01} & A_{02} & A_{03} \\ A_{10} & A_{11} & A_{12} & A_{13} \\ A_{20} & A_{21} & A_{22} & A_{23} \\ A_{30} & A_{31} & A_{32} & A_{33} \end{pmatrix} d_3 = \begin{pmatrix} B_{00} & B_{01} & B_{02} & B_{03} \\ B_{10} & B_{11} & B_{12} & B_{13} \\ B_{20} & B_{21} & B_{22} & B_{23} \\ B_{30} & B_{31} & B_{32} & B_{33} \end{pmatrix} d_0. \quad (4)$$

The matrix D is the transform base of DCT, and it is represented in the form of following Equation (5):

$$D = \begin{pmatrix} d_{00} & d_{01} & d_{02} & d_{03} \\ d_{10} & d_{11} & d_{12} & d_{13} \\ d_{20} & d_{21} & d_{22} & d_{23} \\ d_{30} & d_{31} & d_{32} & d_{33} \end{pmatrix} = ( d_0 \quad d_1 \quad d_2 \quad d_3 ). \quad (5)$$

Equation (4) obtained above represents that eight coefficient data having the same vertical frequency in two coding blocks with the overlap relationship, for example, ($A_{m0}$, $A_{m1}$, $A_{m2}$, $A_{m3}$) and ($B_{m0}$, $B_{m1}$, $B_{m2}$, $B_{m3}$), are linearly dependent on each other (where m=0, 1, 2 or 3). This fact shows that even if one of the eight coefficients is erroneous (hereinafter, an erroneous coefficient will be referred to as error coefficient) and correct coefficient data having been dropped out, the missing error coefficient can be restored by using the remaining seven coefficient data. For example, when an error of $A_{10}$ is detected, $A_{10}$ can be restored by using the data of the other coding block, ($B_{10}$, $B_{11}$, $B_{12}$, $B_{13}$) with use of Equation (4).

However, the number of error coefficients depends on circumstances during recording and reproducing processes, and it would not necessarily be the above case that only one error coefficient is present among the eight coefficient data. Therefore, the state of occurrence of error coefficients is analyzed by the error-correction control circuit 14 according to decision conditions as shown below for each of the eight coefficient data having the same vertical frequency, and the result of this analysis is outputted to the error correcting circuit 15 as an error-correction control signal. The predetermined specified number of order to be used for the decision is set to 2. However, another number of order, e.g, 1, may be used.

The error correction signal can be classified into the following three types, and they are decided as follows:

(a) Zero error correction signal: With respect to two coding blocks in the overlap relationship, a zero error correction signal is outputted for the error coefficients among eight coefficient data having the same vertical frequency component if the error coefficients are present among the eight coefficient data and if the numbers of order of horizontal frequency of the error coefficients are all 2 or more.

(b) Overlap correlation error correction signal: With respect to two coding blocks in the overlap relationship, if error coefficients are present among the eight coefficient data having the same vertical frequency component and if only one error coefficient whose number of order of horizontal frequency is less than 2 exists among the error coefficients, then the other error coefficients are set to zero for error correction. Then, the error coefficient whose number of order is less than 2 is corrected by using the overlap pixel correlation. This instruction is outputted as an overlap correlation error correction signal.

(c) Three-dimensional error correction signal: In a case other than the above ones (a) and (b), that is, when a plurality of error coefficients whose number of order of horizontal frequency is less than 2 are present among the eight coefficient data having the same vertical frequency component, it is decided which of the two coding blocks in the overlap relationship the plurality of error coefficients are present in. Then, for a coding block including an error coefficient whose number of order is less than 2, a three-dimensional error correction signal is outputted instructing for the replacement of all the coefficient data in the coding block with coefficient data in a coding block preceding by one field and located in the same region on the screen which includes all the coefficient data. Further, a zero error correction signal is outputted for a coding block in which error coefficients whose number of order is less than 2 are present only in one of the coding blocks in the overlap relationship and in which coefficients whose number of order of frequency is less than 2 are included.

The error correcting circuit 15 performs error correction as explained below according to an input error-correction control signal:

(d) When an overlap correlation error correction signal is inputted as an error-correction control signal, error correction is performed by using the aforementioned pixel correlation of overlap boundary pixels, for an error coefficient whose number of order of horizontal frequency is the lowest among the error coefficients having the same vertical frequency in the two coding blocks in the overlap relationship, and the remaining error coefficients are changed to zeroes.

(e) When a zero error correction signal is inputted as an error-correction control signal, all the error coefficients included in the coefficient data having the same vertical frequency in the two coding blocks in the overlap relationship are changed to zeroes. This is because these coefficient data have only small influence on the image quality.

(f) When a three-dimensional error correction signal is inputted as an error-correction control signal, all the coefficient data in the coding block are replaced with coefficient data in a coding block preceding by one field in the same region on the screen. In a different way, coefficient data of the previous frames may be used for the replacement.

As described above, according to this embodiment, in the division of digital video signals into coding blocks, they are divided into coding blocks so that coding blocks adjacent to each other on the screen are overlapped so as to share one pixel of their boundary. Then, coefficient data in two coding blocks in the overlap relationship are recorded to separate regions on the recording medium 8 for each coefficient group G. Then, for example, even if a region where a coefficient group $G_{A0}$ of a coding block A has been recorded is not correctly reproduced due to a dropout or other reasons, error correction is possible by using the other coefficient groups and by using Equation (4) for the error coefficient.

Further, as shown in FIG. 5, in the process of recording, a plurality of recording groups in two coding blocks in the overlap relationship are not recorded simultaneously to the same recording track. Therefore, even if narrowing of a track or other phenomenon has occurred at an IN or OUT point during the edition of digital video signals, it would be only one coefficient group G that drops out due to an error. Thus, errors can be corrected with high accuracy.

Furthermore, in this recording and reproducing apparatus, it is arranged that the coefficient group G including coefficient data corresponding to the horizontal low frequency region in two coding blocks in the overlap relationship are not recorded simultaneously by the same recording head 7. Further, it is arranged that the coefficient group G including coefficient data corresponding to the same horizontal frequency in the two coding blocks is not recorded simultaneously by the same recording head 7. These aspects have already been described with reference to FIG. 5. Therefore, a coefficient group that may drop out as an error due to such a reason as damage of one recording head or reproducing head is a combination of low frequency and high frequency components in two coding blocks in the overlap relationship. In the example shown in FIG. 5, there is a possibility that data of the groups $G_{A0}$, $G_{B2}$, $G_{B1}$ may result in an error upon a failure of the recording head 7a, where these groups have horizontal frequencies different from one another. Accordingly, coefficient groups (e.g., groups $G_{A0}$ and $G_{B0}$) including coefficient data corresponding to the same horizontal frequency in the two coding blocks will never result in an error at the same time. Thus, the error correction using pixel correlation of Equation (4) is enabled.

As a result, the possibility that a plurality of low frequency components showing important characteristic properties of the image in the coding blocks may drop out simultaneously is minimized, so that, substantially, almost no three-dimensional error correction signals are outputted in the error-correction control circuit 14. When inter-field error correction is performed, coding blocks different in time from one another would be mixed on the same field so that awkward reproduction might occur particularly to regions on the digital video signals related to a motion. However, such inter-field error correction can be avoided in this embodiment as much as possible.

Low frequency components in the digital video signals show characteristic properties of the digital video signals and have most of the information included therein. On the other hand, high frequency components thereof have statistical properties such that they show finer information therein and that their amplitudes are small. Therefore, the error-correction control circuit 14 can analyze, in terms of the visual sense of an image viewer, the information lost in the reproduction process due to an error in coding block by analyzing the numbers of error coefficients included in the low frequency components whose number of order of horizontal frequency is less than 2 and in the high frequency components whose number of order of horizontal frequency is 2 or more. As a result, image quality can be subjected to sufficient error correction even if a plurality of error coefficients have occurred among the eight coefficient data having the same vertical frequency in two coding blocks in the overlap relationship.

For example, when the region of a coefficient group $G_{A2}$ in the coding block A has resulted in an error during the recording or reproducing process, the error-correction control circuit 14 outputs a zero error correction signal based on this state where error coefficients are generated. The error coefficients are more likely to have small amplitudes by nature, so that sufficient image quality subjected to error correction can be acquired by error correction to set all the error coefficients to zeroes.

When the recording head 7 or the reproducing head 9 is damaged so that coefficient data contained in the coefficient group $G_{x0}$ and the coefficient group $G_{x2}$ have resulted in an error, the error-correction control circuit 14 outputs an overlap correlation error correction signal. However, even after error correction has been performed so that error coefficients contained in the coefficient group $G_{x2}$ of high frequency components, which have small amplitudes, are changed to zeroes, Equation (4) can be developed without causing any large error to occur to the error coefficients contained in the coefficient group $G_{x0}$ of low frequency components, which have large amplitudes by nature. Thus, the error coefficients contained in the coefficient group $G_{x0}$ can be corrected so that image quality corrected sufficiently of errors can be acquired.

Also, although this embodiment has been described on the assumption that the number of order showing horizontal high frequency components is constant regardless of vertical frequency, it is more advantageous that the number of order is varied with the number of order of vertical frequency. For example, the number of order showing horizontal high frequency components is set to become smaller as the vertical frequency becomes higher, taking into consideration a property that coefficient data have smaller amplitudes at higher frequency components. In an example, when the number of order of vertical frequency is 0, the number of order showing horizontal high frequency components is set to 2; when the number of order of vertical frequency is 1 or more, the number of order showing horizontal high frequency components is set to 1. As a result, in regions of higher vertical frequencies, which are of less visual importance, three-dimensional error correction signals become unlikely to occur so that the image quality can be further improved with error correction in regions related to motion in the digital video signals.

In addition, in this embodiment, coefficient data within coding blocks overlapping in the horizontal direction on the screen are divided into groups in the unit of coefficient data that do not have any identical vertical frequency component, and error correction is performed for each group. Otherwise, it is needless to say that equivalent error correction can be achieved even when coefficient data within coding blocks overlapping in the vertical direction on the screen are divided into groups in the unit of coefficient data that do not have any identical horizontal frequency component and error correction is done in the unit of the group. Further, though this embodiment adopts the size of a coding block, the intra-field compression coding and the recording on six tracks per field by three recording heads, it is only an example, and the present invention is not limited thereto. For example, though a 4×4 block has been adopted in this embodiment as the size of a coding block, similar error correction can also be achieved for any size of 8×8, 8×4 or the like. Further, the frequency transform is not limited to the discrete cosine transform, and similar error correction can be achieved also with Hadamard transform, Slant transform, Legendre transform and the like.

As described above, according to the present invention, when an error occurs, a possibility that all the coefficient data within a block may be dropped out and be lost in the block during reproduction can be prevented. Further, the stability of reproduced images can be enhanced by performing error correction with the use of coefficient data of overlapping neighboring blocks, and this is a great practical advantage.

The present invention has been described in detail by way of an embodiment thereof hereinabove. However, the present invention is not limited to the above-described embodiment, and various changes and modifications may be made without departing from the spirit of the invention as set forth in the appended claims.

What is claimed is:

1. A recording and reproducing apparatus with image coding, said recording and reproducing apparatus comprising:

overlap blocking means for dividing input digital video signals into data in two-dimensional coding blocks, each of the coding blocks having first and second axes and comprising of a plurality of pixel data such that neighboring coding blocks are overlapped with each other so as to share at least one boundary pixel in an axis direction;

orthogonal transform means for performing two-dimensional frequency conversion for the plurality of pixel data of the coding blocks obtained by said overlap blocking means to generate coefficient data of individual frequencies;

shuffling means for dividing the coefficient data obtained by said orthogonal transform means into a plurality of coefficient groups so that the coefficient groups do not have a same frequency component of the second axis at least in a frequency region in the coding blocks corresponding to low frequency components of the first axis;

recording means for locating recording data so that the plurality of coefficient groups in a same coding block obtained by said shuffling means are recorded so as to be dispersed into separate regions on a recording medium, and for adding error correction codes for the coefficient data;

reproducing and decoding means for reproducing the recording data from the recording medium, for decoding the coefficient data of the plurality of coefficient groups, individually, and for detecting a presence or absence of an error of coefficient data;

deshuffling means for integrating coefficient data outputted from said reproducing and decoding means into the coding blocks;

error-correction control means for outputting an error-correction control signal based on a number of errors in a coding block and a number of order of two-dimensional frequencies of coefficient data to which errors have occurred when an error has been detected by said reproducing and decoding means;

error correcting means for correcting errors of the coefficient data by an error correcting method selected by the error-correction control signal of said error-correction control means with respect to the coding block in which errors have been detected;

inverse orthogonal transform means for decoding the coefficient data that have been corrected of errors by said error correcting means to pixel data by frequency inverse conversion;

relocating means for generating digital video signals by relocating the pixel data to the coding blocks;

a rotary cylinder operable to helically scan the recording medium; and signal recording means having a plurality of recording heads attached to said rotary cylinder, wherein said recording means outputs the recording data to said signal recording means so that coefficient groups including coefficient data corresponding to low frequency components of the first axis in at least two overlapped coding blocks are not recorded by a same recording head.

2. The recording and reproducing apparatus according to claim 1, wherein said recording means locates the recording data so that the plurality of coefficient groups belonging to the same coding block are not recorded to a same recording track on the recording medium.

3. A recording and reproducing apparatus with image coding, said recording and reproducing apparatus comprising:

overlap blocking means for dividing input digital video signals into data in two-dimensional coding blocks, each of the coding blocks having first and second axes and comprising of a plurality of pixel data such that neighboring coding blocks are overlapped with each other so as to share at least one boundary pixel in an axis direction;

orthogonal transform means for performing two-dimensional frequency conversion for the plurality of pixel data of the coding blocks obtained by said overlap blocking means to generate coefficient data of individual frequencies;

shuffling means for dividing the coefficient data obtained by said orthogonal transform means into a plurality of coefficient groups so that the coefficient groups do not have a same frequency component of the second axis at least in a frequency region in the coding blocks corresponding to low frequency components of the first axis;

recording means for locating recording data so that the plurality of coefficient groups in a same coding block obtained by said shuffling means are recorded so as to be dispersed into separate regions on a recording medium, and for adding error correction codes for the coefficient data;

reproducing and decoding means for reproducing the recording data from the recording medium, for decoding the coefficient data of the plurality of coefficient groups, individually, and for detecting a presence or absence of an error of coefficient data;

deshuffling means for integrating coefficient data outputted from said reproducing and decoding means into the coding blocks;

error-correction control means for outputting an error-correction control signal based on a number of errors in a coding block and a number of order of two-dimensional frequencies of coefficient data to which errors have occurred when an error has been detected by said reproducing and decoding means;

error correcting means for correcting errors of the coefficient data by an error correcting method selected by the error-correction control signal of said error-correction control means with respect to the coding block in which errors have been detected;

inverse orthogonal transform means for decoding the coefficient data that have been corrected of errors by said error correcting means to pixel data by frequency inverse conversion;

relocating means for generating digital video signals by relocating the pixel data to the coding blocks;

a rotary cylinder operable to helically scan the recording medium; and signal recording means having a plurality of recording heads attached to said rotary cylinder, wherein said recording means outputs the recording data so that coefficient groups including coefficient data corresponding to a same frequency component of the first axis in two coding blocks in an overlapped relationship are not recorded by a same recording head.

4. The recording and reproducing apparatus according to claim 3, wherein said recording means locates the recording data so that the plurality of coefficient groups belonging to the same coding block are not recorded to a same recording track on the recording medium.

5. A recording and reproducing apparatus with image coding, said recording and reproducing apparatus comprising:

overlap blocking means for dividing input digital video signals into data in two-dimensional coding blocks, each of the coding blocks having first and second axes and comprising of a plurality of pixel data such that neighboring coding blocks are overlapped with each other so as to share at least one boundary pixel in an axis direction;

orthogonal transform means for performing two-dimensional frequency conversion for the plurality of pixel data of the coding blocks obtained by said overlap blocking means to generate coefficient data of individual frequencies;

shuffling means for dividing the coefficient data obtained by said orthogonal transform means into a plurality of coefficient groups so that the coefficient groups do not have a same frequency component of the second axis at least in a frequency region in the coding blocks corresponding to low frequency components of the first axis;

recording means for locating recording data so that the plurality of coefficient groups in a same coding block obtained by said shuffling means are recorded so as to be dispersed into separate regions on a recording medium, and for adding error correction codes for the coefficient data;

reproducing and decoding means for reproducing the recording data from the recording medium, for decoding the coefficient data of the plurality of coefficient groups, individually, and for detecting a presence or absence of an error of coefficient data;

deshuffling means for integrating coefficient data outputted from said reproducing and decoding means into the coding blocks;

error-correction control means for outputting an error-correction control signal based on a number of errors in a coding block and a number of order of two-dimensional frequencies of coefficient data to which errors have occurred when an error has been detected by said reproducing and decoding means;

error correcting means for correcting errors of the coefficient data by an error correcting method selected by the error-correction control signal of said error-correction control means with respect to the coding block in which errors have been detected;

inverse orthogonal transform means for decoding the coefficient data that have been corrected of errors by said error correcting means to pixel data by frequency inverse conversion; and relocating means for generating digital video signals by relocating the pixel data to the coding blocks, wherein said error-correction control means outputs a zero error correction signal for replacing an error coefficient with a zero when a plurality of error coefficients are present in coefficient data having a same frequency in the second axis in two coding blocks in an overlapped relationship and when all the errors are present at numbers of order higher than a specified number of order, said error-correction control means outputs an overlap correlation error correction signal for instructing error correction by making use of a correlation between coefficient data of neighboring coding blocks when a plurality of errors are present in coefficient data having a same frequency in the second axis in two coding blocks in the overlapped relationship and when only one error coefficient is present at a number of order lower than a specified number of order, said error-correction control means outputs a three-dimensional error correction signal for replacing all the coefficient data in the coding block with coefficient data of a preceding frame or preceding field when two or more errors are present at numbers of order lower than a specified number of order for each coding block and when error coefficients are present on a side of lower numbers of order than a specified number of order in coefficient data having a same frequency in the second axis for each coding block, and said error-correction control means outputs a zero error correction signal for replacing the error coefficients with zeroes for coding blocks when no error coefficients are present in the coding blocks on a side of lower numbers of order than a specified number of order on a coding block basis.

6. The recording and reproducing apparatus according to claim 5, wherein said recording means locates the recording data so that the plurality of coefficient groups belonging to the same coding block are not recorded to a same recording track on the recording medium.

7. The recording and reproducing apparatus according to claim 5, wherein when the overlap correlation error correction signal is received from said error-correction control means, said error correcting means corrects, by using a correlation of pixels overlapped in the first axis on a screen, error coefficients corresponding to frequency components of a lowest region of the first axis out of a plurality of error coefficients in coefficient data having a same frequency in the second axis in two coding blocks in the overlapped relationship and corrects remaining error coefficients as zeroes, and corrects to zeroes all of the plurality of error coefficients among coefficient data having a same frequency in the second axis in two coding blocks in the overlapped relationship when the zero error correction signal is received from said error-correction control means, and when the three-dimensional error correction signal is received, said error correcting means replaces all the coefficient data within a coding block for correction with coefficient data of a corresponding coding block preceding by one field or one frame and constituting a same region on the screen.

8. The recording and reproducing apparatus according to claim 5, wherein said error-correction control means changes a specified number of order of frequencies in the first axis in response to a number of order of frequencies in the second axis.

* * * * *

UNITED STATES PATENT AND TRADEMARK OFFICE
CERTIFICATE OF CORRECTION

PATENT NO. : 6,289,173 B1  
DATED : September 11, 2001  
INVENTOR(S) : Mitsuhiro Miyashita and Tatsushi Bannai It is certified that error appears in the above-identified patent and that said Letters Patent is hereby corrected as shown below:

<u>Title page, Item [54] and Column 1, lines 1-9</u>,  
Change the title to the following:  
-- ERROR CORRECTION IN A RECORDING AND REPRODUCTION DEVICE IN WHICH COEFFICIENT GROUPS INCLUDING COEFFICIENT DATA CORRESPONDING TO LOW FREQUENCY COMPONENTS OF THE FIRST AXIS IN AT LEAST TWO OVERLAPPED CODING BLOCKS ARE NOT RECORDED BY THE SAME RECORDING HEAD --

Signed and Sealed this

Twenty-fifth Day of June, 2002

*Attest:*

*Attesting Officer*

JAMES E. ROGAN  
*Director of the United States Patent and Trademark Office*